Oct. 24, 1961 T. L. GILTINAN 3,005,590
ANALOG DIVISION CIRCUIT
Filed June 24, 1960
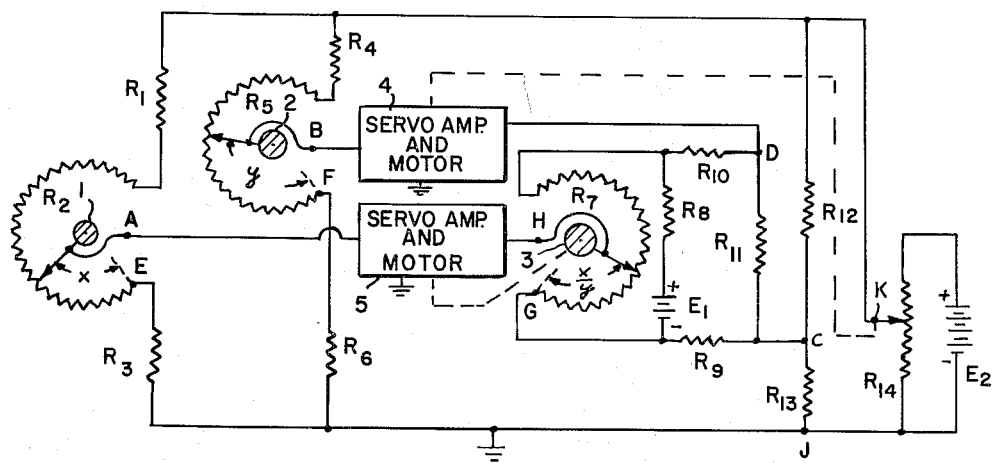
INVENTOR.
THOMAS L. GILTINAN
BY
ATTORNEY
AGENT

United States Patent Office 3,005,590
Patented Oct. 24, 1961

3,005,590
ANALOG DIVISION CIRCUIT
Thomas L. Giltinan, 1110 McGavack Place,
Tullahoma, Tenn.
Filed June 24, 1960, Ser. No. 38,678
2 Claims. (Cl. 235—196)
(Granted under Title 35, U.S. Code (1952), sec. 266)

This invention described herein may be manufactured and used by or for the Government for governmental purposes without the payment of any royalty thereon.

The purpose of this invention is to provide an analog division circuit in which the inputs representing the two quantities of which the ratio is desired and the output representing the ratio are in the form of angular shaft positions.

Briefly, the circuit comprises two linear input potentiometers driven by two input shafts the angular positions of which represent the divisor and the dividend, and a linear output potentiometer coupled to an output shaft the angular position of which represents the quotient. The divisor and dividend potentiometer elements are connected in parallel across an adjustable source of voltage while a constant voltage is applied across the element of the quotient potentiometer. A first servo system operating on the adjustable voltage source maintains the voltage at the slider of the divisor potentiometer equal to the constant voltage applied to the quotient potentiometer element, and a second servo system operating on the quotient potentiometer shaft maintains equality between the voltages on the sliders of the dividend and quotient potentiometers. This arrangement results in the angular position of the quotient potentiometer shaft being proportional at all times to the ratio of the angular positions of the shafts coupled to the divisor and dividend potentiometers.

A more detailed description of the invention will be given with respect to the specific embodiment thereof shown in the single figure of the drawing.

Referring to the drawing, $R_2$ is a linear potentiometer connected so that the resistance between point A, the slider, and point E is proportional to the angular rotation $x$ of dividend input shaft 1. Similarly, the $R_5$ is a linear potentiometer connected so that the resistance between point B and point F is proportional to the angular rotation $y$ of divisor input shaft 2. The angles $x$ and $y$ accordingly represent the divisor and dividend, respectively. A third potentiometer $R_7$ has its slider driven from output shaft 3 and is so connected that the resistance between points H and G is proportional to the angle through which shaft 3 has been turned. As will be seen later, this angle is proportional to the ratio $$\frac{x}{y}$$

and is therefore so designated.

Voltage source $E_2$ together with potentiometer $R_{14}$ provide a source of variable voltage between point K and grounded point J and this voltage is applied to the elements of potentiometers $R_2$ and $R_5$ which are connected in parallel between point K and ground. A constant potential is applied across $R_7$ by means of source $E_1$ acting through $R_8$. Potential divider $R_9$—$R_{10}$—$R_{11}$ is provided to correct for the span and end resistance of potentiometer $R_7$ if necessary. $R_9$ and $R_{10}$ are small resistors of the value required to make the potential between point H and point C zero where shaft 3 is in its extreme CW position and to make the potential between point H and point D zero where shaft 3 is in its extreme CCW position. The potential between points D and C is therefore equal to the effective potential across potentiometer $R_7$.

Potential divider $R_{12}$—$R_{13}$ introduces a small potential between points C and J for the purpose of compensating errors introduced into the circuit by the end resistance of potentiometers $R_2$ and $R_5$ and the resistance of electrical cables connecting $R_2$ and $R_5$ to the remainder of the circuit. This method of error correction permits the input shafts $R_2$ and $R_5$ each to have a physically realizable "zero" position without introducing errors in the computing process. To this end, $R_3$ is selected to reduce the potential between points A and C to zero with shaft 1 in its $x=0$ position and $R_6$ is selected to reduce the potential between points B and C to zero with shaft 2 in its $y=0$ position. Further, $R_1$ and $R_4$ are selected to reduce the potential between points A and B to zero when shafts 1 and 2, i.e., potentiometers $R_2$ and $R_5$, are in their full scale positions. To satisfy this condition either $R_1$ or $R_4$ may be zero without introducing error into the system, however, which resistor may be zero must be determined by the end and cable resistance characteristics of $R_2$ and $R_5$.

The slider on potentiometer $R_{14}$ is driven by servo system 4 which has as an input the voltage difference between points B and D. If this difference is other than zero the servo system moves the slider of potentiometer $R_{14}$ until the difference is reduced to zero. In a similar manner shaft 3 of potentiometer $R_7$ is driven by servo system 5 which has as an input the potential difference between points A and H. If the difference is other than zero the servo system rotates shaft 3 in the proper direction until the difference is reduced to zero. Servo systems 4 and 5 may be of any suitable type capable of operating in the above described manner. A number of suitable systems are commercially available, such, for example, as the Brown Model 356410–1 servo amplifier and the Brown Model 76750–1 and Model 76750–3 servo motors.

Considering further the circuit shown in the drawing, it is evident that, with $R_1$, $R_4$, $R_3$ and $R_6$ adjusted as previously explained, points E and F are always at the same potential and the upper ends of the elements of potentiometers $R_2$ and $R_5$ are always at the same potential. Therefore the potentials existing across the resistance elements of $R_2$ and $R_5$ are always equal. Also, as already explained, point D is at the same potential as the upper end of $R_7$ and point C is at the same potential as point G so that the potential across $R_7$ equals the potential between points D and C. Further, since points E and F are at the same potential as point C, as previously explained, point G is at the same potential as points E and F. Therefore, within its limits of operation, the circuit operates automatically through servo systems 4 and 5 to keep the potential between points B and F equal to the potential across $R_7$ and the potential between points H and G equal to the potential between points A and E.

Limits on the circuit are: (1) that $y$ must be greater than zero, since for $y=0$ the resistance between points B and F is zero which prevents there being a voltage between these points equal to that across $R_7$ as required; and (2) the angle $x$ must not exceed the angle $y$, since the condition $x=y$ produces full rotation of shaft 3 of $R_7$.

The magnitude of $E_2$ must be sufficiently greater than the magnitude of $E_1$ to permit the potential between points B and E to be raised to equality with the potential across $R_7$ at the smallest value of $y$. Representative values of these voltages are $E_1=1.34$ volts and $E_2=6–50$ volts, the exact values depending upon the range and sensitivity desired. Representative values for other components of the circuit, with the exception of resistors $R_1$, $R_4$, $R_3$ and $R_6$, the selection of which has been already discussed, are:

$R_2$, $R_5$, $R_7$, $R_{11}$ and $R_{12}=1000$ ohms
$R_9$, $R_{10}=0$ to 10 ohms as required
$R_8=0$ to 500 ohms as determined by desired range of $R_5$
$R_{13}=10$ ohms
$R_{14}=30$ to 100 ohms (exact value not critical)

In operating the analog division circuit the $x$ and $y$ inputs are applied as proportionate rotations of shafts 1 and 2 within the limits specified. The angular position of output shaft 3 is then proportional to $x/y$.

Advantages of this circuit over conventional circuits of this type are:

(1) At balance no current is drawn through the sliders of $R_2$ and $R_5$ since, at balance, points A and H are at the same potential and points B and D are at the same potentials. Errors due to currents at the sliders are thereby avoided.

(2) Automatic gain control systems, where the gain must continuously vary as a function of either the $x$ or $y$ input, are not necessary, thereby permitting the use of standard servo amplifiers.

(3) Accuracy of the circuit is not dependent on the accuracy of the voltages $E_1$ and $E_2$. Changes of as much as 10% to 20% in these voltages do not appreciably affect the accuracy.

(4) Normal linearity rather than zero based linearity potentiometers may be used permitting greater accuracy but retaining a "zero" position.

(5) Potentiometers $R_2$ and $R_5$ may be remotely located from the associated computer components and at locations separate from each other.

What is claimed is:

1. An analog division circuit comprising a dividend potentiometer, a divisor potentiometer and a quotient potentiometer, each potentiometer comprising a resistance element and a slider, a variable voltage source, means connecting one terminal of each potentiometer element to one side of said variable voltage source, means connecting the other terminal of each of said dividend and divisor potentiometer elements to the other side of said variable voltage source, means for applying a fixed potential across the element of said quotient potentiometer, a first servo system for adjusting the voltage of said variable voltage source, said first servo system having input circuits coupled to the slider of said divisor potentiometer and the resistance element of said quotient potentiometer and operating when the potential between the slider and the said one end of the resistance element of said divisor potentiometer differs from the fixed potential across the resistance element of said quotient potentiometer to change the voltage of said variable voltage source in the direction and to the extent required to reduce said potential difference to zero, a second servo system for adjusting the position of the slider of said quotient potentiometer, said second servo system having input circuits connected to the sliders of said dividend and quotient potentiometers and operating when the potential between the slider and the said one end of said quotient potentiometer differs from the potential between the slider and the said one end of said dividend potentiometer to adjust the slider of said quotient potentiometer in the direction and to the extent necessary to reduce said potential difference to zero, the displacement of the sliders of said dividend, divisor and quotient potentiometers from the said one ends of the resistance elements thereof constituting analogs of the dividend, divisor and quotient, respectively.

2. An analog division circuit comprising a dividend potentiometer, a divisor potentiometer and a quotient potentiometer, each potentiometer comprising a resistance element having first and second end terminals and a slider, each potentiometer also having a shaft mechanically coupled to its slider such that a linear relation exists between the angular position of the shaft and the resistance between the slider and the first end terminal of the potentiometer resistance element, a source of variable voltage, means connecting the resistance elements of said dividend and divisor potentiometers in shunt to said variable voltage source with the said first end terminals connected to the same terminal of said source, means for applying a fixed potential across the resistance element of said quotient potentiometer, a first servo system for comparing the potential between the slider and the said first end terminal of said divisor potentiometer with the fixed potential across the resistance element of said quotient potentiometer and operating to maintain equality between these potentials by adjustment of the voltage of said variable voltage source, a second servo system for comparing the potential between the slider and the said first end terminal of said quotient potentiometer with the potential between the slider and the said first end terminal of said dividend potentiometer and operating to maintain equality between these potentials by adjusting the position of the slider of said quotient potentiometer, the angular positions of the shafts of the dividend and divisor potentiometers constituting the input analogs of the dividend and divisor, respectively, and the angular position of the quotient potentiometer constituting the output analog of the quotient.

References Cited in the file of this patent

UNITED STATES PATENTS 2,938,669    Henry _____ May 31, 1960